United States Patent
Ono et al.

(10) Patent No.: US 8,253,308 B2
(45) Date of Patent: Aug. 28, 2012

(54) POLYMER ACTUATOR

(75) Inventors: Yasuichi Ono, Miyagi-ken (JP);
Katsutoshi Suzuki, Miyagi-ken (JP);
Kinji Asaka, Osaka-fu (JP)

(73) Assignee: Alps Electric Co., Ltd., Tokyo (JP)

( * ) Notice: Subject to any disclaimer, the term of this patent is extended or adjusted under 35 U.S.C. 154(b) by 9 days.

(21) Appl. No.: 13/044,082

(22) Filed: Mar. 9, 2011

(65) Prior Publication Data

US 2011/0156538 A1 Jun. 30, 2011

Related U.S. Application Data

(63) Continuation of application No. PCT/JP2009/065906, filed on Sep. 11, 2009.

(30) Foreign Application Priority Data

Sep. 12, 2008 (JP) .................................. 2008-234541

(51) Int. Cl.
*H01L 41/047* (2006.01)
(52) U.S. Cl. ........................................ 310/363; 310/800
(58) Field of Classification Search ................... 310/363, 310/800
See application file for complete search history.

(56) References Cited

U.S. PATENT DOCUMENTS

| | | | |
|---|---|---|---|
| 5,977,685 A | * | 11/1999 | Kurita et al. .................. 310/311 |
| 2007/0210678 A1 | * | 9/2007 | Hattori et al. ................. 310/366 |
| 2010/0164330 A1 | * | 7/2010 | Komatsu et al. .............. 310/365 |

FOREIGN PATENT DOCUMENTS

| | | |
|---|---|---|
| JP | 2005-176428 | 6/2005 |
| JP | 2007-204682 | 8/2007 |
| JP | 2008-34268 | 2/2008 |

OTHER PUBLICATIONS

International Search Report issued in corresponding PCT Application No. PCT/JP2009/065906; mailed Dec. 22, 2009.

* cited by examiner

*Primary Examiner* — Derek Rosenau
(74) *Attorney, Agent, or Firm* — Brinks Hofer Gilson & Lione

(57) ABSTRACT

A polymer actuator includes: a pair of electrode layers made of an ionic liquid, a polymer, and carbon nanoparticles; and an electrolyte layer provided between the pair of electrode layers, wherein the carbon nanoparticles are a mixture of carbon nanotubes (hereinafter, referred to as CNTs) and carbon nanohorns (hereinafter, referred to as CNHs), a ratio by weight of the carbon nanoparticles to the total weight of the ionic liquid, the polymer, and the carbon nanoparticles contained in the pair of electrodes is equal to or higher than 25 wt % and equal to or lower than 80 wt %, a mixing ratio of the CNTs to the CNHs contained in the carbon particles is in a range of (CNT):(CNH)=1:1 to 3:1, and a ratio by weight of the polymer is equal to or higher than 17.7 wt % and equal to or lower than 30.2 wt %.

2 Claims, 3 Drawing Sheets

POLYMER ACTUATOR

CLAIM FOR PRIORITY

This application is a Continuation of International Application No. PCT/JP2009/065906 filed on Sep. 11, 2009, which claims benefit of Japanese Patent Application No. 2008-234541 filed on Sep. 12, 2008. The entire contents of each application noted above are hereby incorporated by reference.

BACKGROUND OF THE INVENTION

1. Field of the Invention

The present invention relates to an actuator that is deformed when a potential difference is applied between electrodes, and more particularly, to a polymer actuator that is deformed as ions move due to an electric field.

2. Description of the Related Art

As an actuator element which can be operated in the air or in a vacuum, an actuator which uses a gel of carbon nanotubes and an ionic liquid as a conductive and elastic active layer is proposed (Japanese Unexamined Patent Application Publication No. 2005-176428).

In a method according to a related art, in a case where an amount of carbon nanotubes contained is particularly high, a homogeneous mixture of the carbon nanotubes, a polymer, and an ionic liquid is difficult to obtain, resulting in degradation of the performance of the actuator. Particularly, there is a limitation to generate large displacement and driving force.

SUMMARY OF INVENTION

It is desirable to provide a polymer actuator capable of generating higher driving force and higher displacement than those in the related art by achieving a suitable mixing ratio of carbon nanotubes to carbon nanohorns.

According to an aspect of the invention, there is provided a polymer actuator including: a pair of electrode layers made of an ionic liquid, a polymer, and carbon nanoparticles; and an electrolyte layer provided between the pair of electrode layers. The carbon nanoparticles is a mixture of carbon nanotubes (hereinafter, referred to as CNTs) and carbon nanohorns (hereinafter, referred to as CNHs). A ratio by weight of the carbon nanoparticles to the total weight of the ionic liquid, the polymer, and the carbon nanoparticles contained in the pair of electrodes is equal to or higher than 25 wt % and equal to or lower than 80 wt %. A mixing ratio of the CNTs to the CNHs contained in the carbon particles is in a range of (CNT):(CNH)=1:1 to 3:1. A ratio by weight of the polymer is equal to or higher than 17.7 wt % and equal to or lower than 30.2 wt %.

Particularly, it is preferable that the mixing ratio of the CNTs to the CNHs be 2:1.

According to the aspect of the invention, by setting the mixing ratio of the pair of electrode layers made of the ionic liquid, the polymer, and the carbon nanoparticles to a suitable range, a polymer actuator which exhibits higher generative force and higher displacement than those in the related art can be obtained.

By the polymer actuator according to the aspect of the invention, higher driving force and higher displacement than those in the related art can be generated.

DESCRIPTION OF THE EMBODIMENTS

Figure 1A:
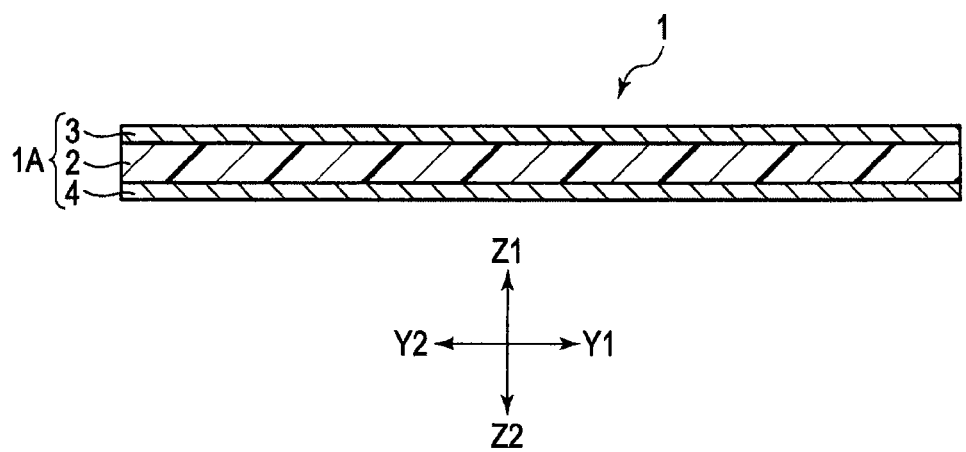
FIG. 1A is a cross-sectional view for explaining the basic principle of a polymer actuator.
Figure 1B:
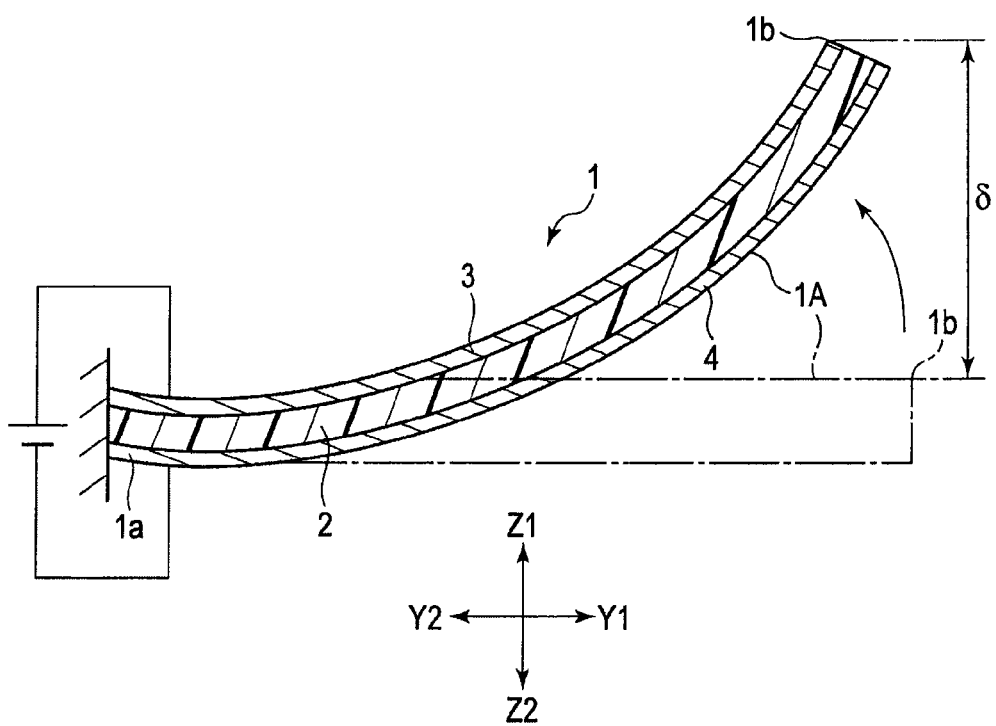
FIG. 1B is a cross-sectional view illustrating a driven state of the polymer actuator.

FIG. 1A is a cross-sectional view for explaining the basic principle of a polymer actuator, and FIG. 1B is a cross-sectional view illustrating a driven state of the polymer actuator.

First, the basic configuration of the polymer actuator will be described.

FIGS. 1A and 1B illustrate an ion conductivity-type polymer actuator 1 which is configured as a laminate 1A of three layers in which an electrolyte layer 2, a first electrode layer 3 provided on one surface of the electrolyte layer 2, and a second electrode layer 4 provided on the other side of the electrolyte layer 2 are overlapped.

The electrolyte layer 2 is a resin layer which enables ion exchange and is formed by impregnating a cation exchange resin with an electrolytic solution as electrolyte. The cation exchange resin is made by introducing a hydrophilic functional group such as a sulphonate group or a carboxyl group to polyethylene, polystyrene, fluororesin, or the like. The electrolytic solution is a polarizable organic solvent containing salt, an ionic liquid that will be described later or the like. In addition, the electrolyte layer 2 may be made by incorporating an ionic liquid into a base polymer such as polyvinylidene fluoride to have a gel-like form.

Carbon nanoparticles, polymer, and an ionic liquid are used for the first and second electrode layers 3 and 4. The carbon nanoparticles are made by mixing carbon nanotubes (CNTs) and carbon nanohorns (CNHs). As described later, with regard to a mixing ratio (ratio by weight) of the carbon nanoparticles to the total weight (carbon nanoparticles+ionic liquid+polymer), the lower limit thereof is 25 wt %, and the upper limit thereof is 80 wt % or less.

As described in the following examples, the mixing ratio of the carbon nanotubes (CNTs) and the carbon nanohorns (CNHs) contained in the carbon nanoparticles is suitably in the range of (CNT):(CNH)=1:1 to 3:1, preferably is 2:1, and more preferably, is 42:23. In such mixing ratios, characteristics of the actuator are dramatically enhanced.

The ionic liquid (IL) used in the embodiment of the invention is also called an ambient temperature molten salt or simply called a molten salt, and is a salt exhibiting a molten state in a wide temperature range including ambient temperature (room temperature). For example, the ionic liquid is a salt exhibiting a molten state at a temperature of 0° C., preferably, −20° C., and more preferably, −40° C. In addition, it is preferable that the ionic liquid used in the embodiment of the invention have high ion conductive properties.

In the embodiment of the invention, various well-known ionic liquids may be used. However, those that exhibit a liquid state at ambient temperature (room temperature) or at a temperature close to ambient temperature and thus are stable are preferable.

Examples of the suitable ionic liquid used in the embodiment of the invention include those made of cations (preferably, imidazolium ions or quaternary ammonium ions) expressed by the general formulae (I) to (IV) as follows and anions (X⁻).

[Formula 1]

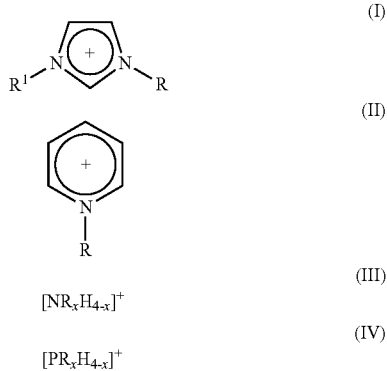

(I)

(II)

$[NR_xH_{4-x}]^+$ (III)

$[PR_xH_{4-x}]^+$ (IV)

In the formulae (I) to (IV), R represents a linear or branched alkyl group having 1 to 12 carbon atoms, or a linear or branched alkyl group which includes ether bonds and has total number of carbon and oxygen atoms of 3 to 12. In the formula (I), $R^1$ represents a linear or branched alkyl group having 1 to 4 carbon atoms or a hydrogen atom. In the formula (I), it is preferable that R and $R^1$ be not the same.

In the formulae (III) and (IV), x is an integer of 1 to 4.

Examples of the linear or branched alkyl group having 1 to 12 carbon atoms include methyl, ethyl, n-propyl, isopropyl, n-butyl, isobutyl, sec-butyl, t-butyl, pentyl, hexyl, heptyl, octyl, nonyl, decyl, undecyl, and dodecyl groups and the like. The number of carbon atoms is preferably 1 to 8, and more preferably, is 1 to 6.

Examples of the linear or branched alkyl group having 1 to 4 carbon atoms include methyl, ethyl, n-propyl, isopropyl, n-butyl, isobutyl, sec-butyl, and t-butyl groups.

Examples of the linear or branched alkyl group which includes ether bonds and the total number of carbon atoms and oxygen atoms of 3 to 12 include $CH_2OCH_3$, and $(CH_2)_p(OCH_2CH_2)_qOR^2$ (here, p is an integer of 1 to 4, q is an integer of 1 to 4, and $R^2$ represents $CH_3$ or $C_2H_5$). Examples of anions (X⁻) include tetrafluoroborate ions ($BF_4$), $BF_3CF_3$, $BF_3C_2F_5$, $BF_3C_3F_7$, $BF_3C_4F_9$, hexafluorophosphate ions ($PF_6$), bis(trifluoromethanesulfonyl)imidate ions (($CF_3SO_2)_2N$), perchlorate ions ($ClO_4$), tris(trifluoromethanesulfonyl)carbonate ions ($(CF_3SO_2)_3C$), trifluoromethanesulfonate ions ($CF_3SO_3$), dicyanamide ions (($CN)_2N$), trifluoroacetate ions ($CF_3COO$), organic carboxylate ions, and halogen ions.

Specifically, in the ionic liquid, for example, 1-ethyl-3-methylimidazolium or $[N(CH_3)(CH_3)(C_2H_5)(C_2H_4OC_2H_4OCH_3)]^+$ as cations, and halogen ions or tetrafluoroborate ions as anions may be used. Moreover, two or more kinds of cations and/or anions may be used so as to further lower a melting point.

However, the ionic liquid is not limited to the combinations, and any ionic liquid having a conductivity of 0.1 Sm⁻¹ or higher may be used.

The carbon nanotube used in the embodiment of the invention is a carbon-based material made by wrapping graphene (a sheet of graphite) into a cylinder, and the carbon nanohorn is a carbon-based material made by wrapping graphene into a cone.

The carbon nanoparticles are roughly categorized as single-walled nanotubes (SWNTs) and multi-walled nanotubes (MWNTs) by the number of peripheral walls, and chiral (spiral), zigzag, and armchair classified by the structure of graphene. In this way, various types are known.

With regard to the carbon nanoparticles, in general, single-walled nanotubes which have a high aspect ratio, that is, which are thin and long are likely to form gel. For example, carbon nanoparticles having an aspect ratio of $10^3$ or higher, and preferably, $10^4$ or higher may be employed. The lengths of the carbon nanoparticles are typically 1 μm or greater, preferably, 50 μm or greater, and more preferably, 500 μm or greater. The upper limit of the lengths of the carbon nanoparticles is not particularly limited, and for example, is about 3 mm.

Therefore, according to this embodiment of the invention, it is preferable that the gel-like composition be obtained from the SWNTs.

A suitable example of the carbon nanotubes that is put into practical use includes HiPco (produced by Carbon Nanotechnologies, Inc.) which uses carbon monoxide as a raw material and can be relatively mass produced, and of course, is not limited to this.

Examples of the polymer used in the embodiment of the invention include a copolymer of fluorinated olefin having hydrogen atoms such as a copolymer of polyvinylidene fluoride-hexafluoropropylene [PVDF(HFP)] and perfluorinated olefin, a homopolymer of fluorinated olefin having hydrogen atoms such as polyvinylidene fluoride (PVDF), perfluorosulfonic acid (Nafion), poly-2-hydroxyethyl methacrylate (poly-HEMA), poly(metha)acrylates such as polymethyl methacrylate (PMMA), polyethylene oxide (PEO), polyacrylonitrile (PAN) and the like.

As illustrated in FIG. 1B, when an electric field is applied to the electrolyte layer 2 so that the first electrode layer 3 becomes an anode side and the second electrode layer 4 becomes a cathode side, cations in the electrolyte layer 2 move toward the second electrode layer 4 which is the cathode side. In a case where the carbon nanoparticles are incorporated into the insides of the first and second electrode layers 3 and 4 which enable ion exchange as a conductive filler like the electrolyte layer 2, the cations that dissociate inside the first and second electrode layers 3 and 4 move toward the second electrode layer 4 side.

As a result, the volume of the electrolyte layer 2 is likely to expand at a position biased to the second electrode layer 4 side. That is, expansion stress occurs on the second electrode layer 4 side, and expansion strain occurs due to this, so that bending stress occurs in the laminate 1A. Therefore, as illustrated in FIG. 1B, bending occurs in the polymer actuator 1.

Next, a suitable mixing amount of carbon particles and a suitable mixing ratio of the carbon nanotubes to the carbon nanohorns in the polymer actuator 1 having the above-mentioned basic configuration will be described in terms of generative force and displacement.

Figure 2:
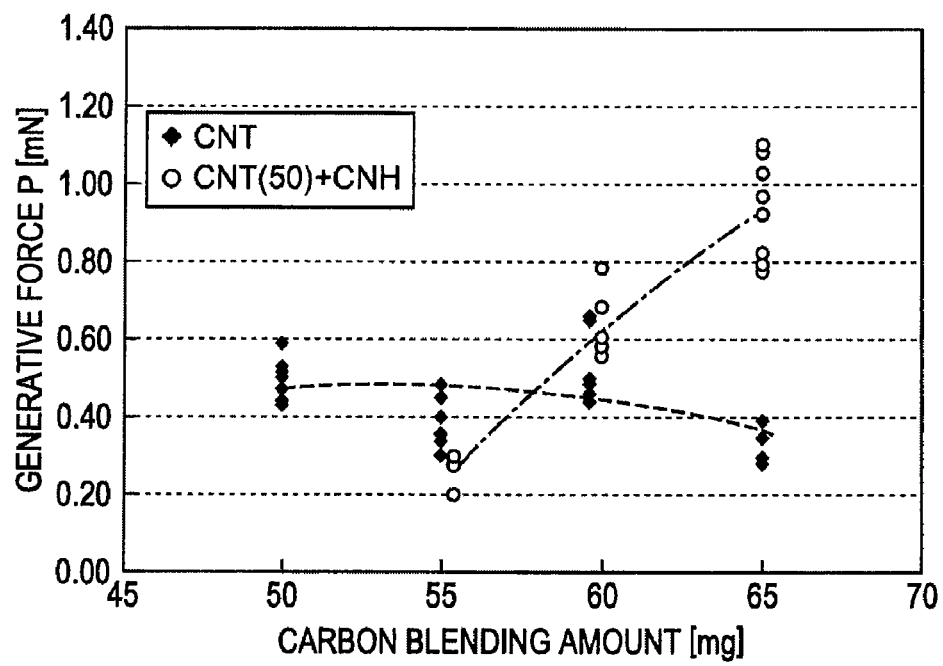
FIG. 2 is a graph showing a relationship between mixing amount of carbon particles and generative force as characteristics of the polymer actuator.
Figure 3:
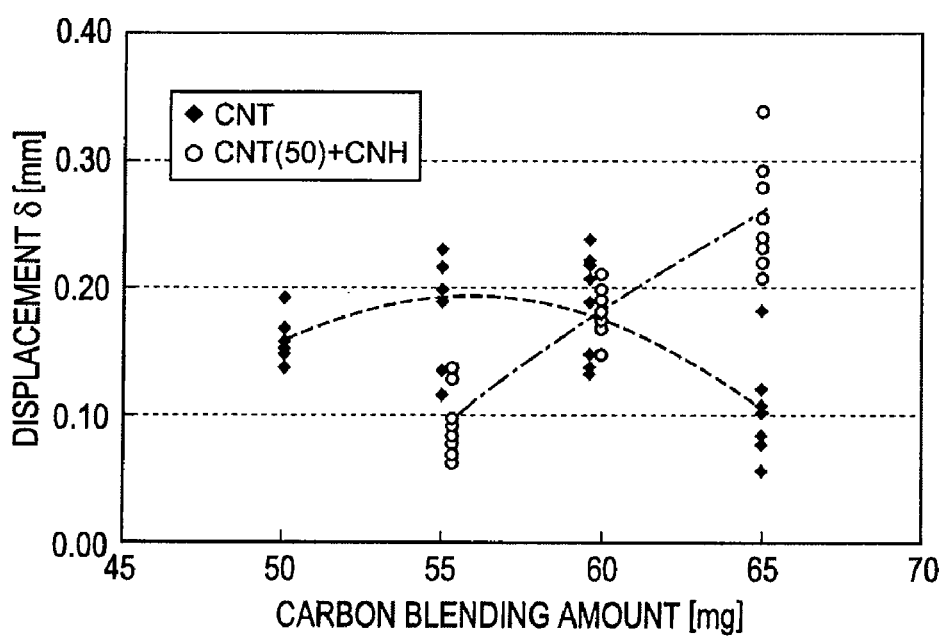
FIG. 3 is a graph showing a relationship between the mixing amount of the carbon particles and displacement as characteristics of the polymer actuator.

FIG. 2 is a graph showing a relationship between the mixing amount of carbon particles and the generative force as characteristics of the polymer actuator, and FIG. 3 is a graph showing a relationship between the mixing amount of the carbon particles and the displacement as characteristics of the polymer actuator.

Moreover, in the following description, the displacement δ represents, as illustrated in FIG. 1B, when a free end 1b is bent in the Z direction with respect to a fixed end 1a, a difference between the position of the free end 1b in the Z direction in an initial state indicated by the dashed line and a position thereof in the Z direction after deformation indicated by the solid line.

The displacement δ is in proportion to a length (distance) L between the fixed end 1a and the free end 1b. In addition, the generative force represents the maximum force to lift the free end 1b of the polymer actuator 1, or the maximum load (an amount of load withstood) to maintain a displacement of δ=0 when a load applied to the free end 1b is increased.

Mixing Amount of Carbon Particles

FIGS. 2 and 3 show the generative force P and the displacement δ at mixing amounts of the carbon particles of 50 mg, 55 mg, 60 mg, and 65 mg.

In addition, in FIGS. 2 and 3, "♦CNT" represents a case of 100% carbon nanotubes (CNTs), and "♦CNT(50)+CNH" represents a case where 50 mg of CNTs are mixed and the balance is carbon nanohorns (CNHs). That is, it means that in the case where the amount of CNTs is 50 mg, the mixing amount of CNHs is 0 mg, in a case where the amount of CNTs is 55 mg, 5 mg of CNHs is contained, in a case where the amount of CNTs is 60 mg, 10 mg of CNHs is contained, and in a case where the amount of CNTs is 65 mg, 15 mg of CNHs is contained.

It can be seen from FIGS. 2 and 3 that compared to the case where the mixing amount of carbon particles is 55 mg and the amount of CNTs is 50 mg (the amount of CNHs is 5 mg), in the case where the mixing amount of carbon particles is 60 mg and the amount of CNTs is 50 mg (the amount of CNHs is 10 mg), higher generative force P and higher displacement δ occur. In addition, compared to the case where the mixing amount of carbon particles is 60 mg and the amount of CNTs is 50 mg (the amount of CNHs is 10 mg), in the case where the mixing amount of carbon particles is 65 mg and the amount of CNTs is 50 mg (the amount of CNHs is 15 mg), higher generative force P and higher displacement δ occur. That is, as the mixing amount of carbon particles is increased, the generative force P and the displacement δ are increased.

Relationship between Generative Force and Displacement

Figure 4:
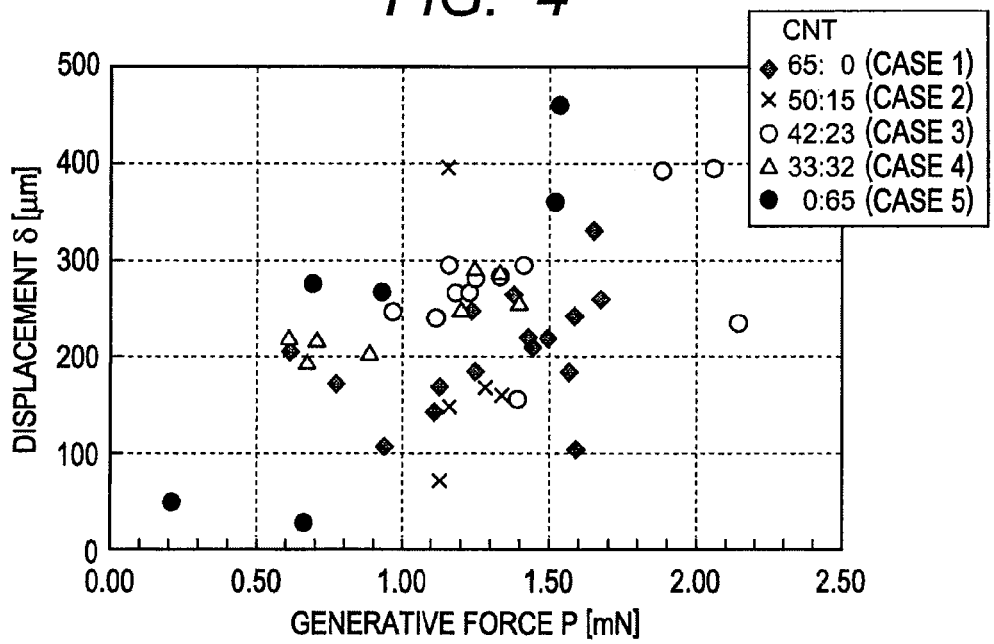
FIG. 4 is a graph showing a relationship between the generative force and the displacement at mixing ratios of CNTs to CNHs as characteristics of the polymer actuator.

FIG. 4 is a graph showing a relationship between the generative force and the displacement at mixing ratios of CNTs to CNHs as characteristics of the polymer actuator.

In FIG. 4, A ratio of the carbon particles, the ionic liquid, and the polymer in wt % is (carbon particles):(ionic liquid):(polymer)=65 mg:120 mg:80 mg≈24.5:45.5:30.0.

In addition, in FIG. 4, ♦ represents Case 1 where (CNT):(CNH)=65:0 (only CNT), x represents Case 2 where (CNT):(CNH)=50:15 (≈3:1), O represents Case 3 where (CNT):(CNH)=42:23 (≈2:1), Δ represents Case 4 where (CNT):(CNH)=33:32 (≈1:1), and ● represents Case 5 where (CNT):(CNH)=0:65 (only CNH).

Table 1 shows maximum values and minimum values of the generative force P and the displacement δ that can seen from FIG. 4 for each case.

TABLE 1

|  | Case 1 Only CNT | Case 2 3:1 (50:15) | Case 3 2:1 (42:23) | Case 4 1:1 (33:32) | Case 5 Only CNH |
|---|---|---|---|---|---|
| Maximum Generative Force [mN] | 1.6 | 1.3 | 2.2 | 1.4 | 1.6 |
| Minimum Generative Force [mN] | 0.6 | 0.9 | 0.9 | 0.6 | 0.2 |
| Maximum Displacement [μm] | 260 | 400 | 390 | 300 | 450 |
| Minimum Displacement [μm] | 100 | 80 | 160 | 190 | 20 |

In the comprehensive evaluation of Table 1, it can be seen that the maximum generative force is generated in Case 3 of 3((CNT):(CNH)=42:23(≈2:1)) as 2.2 mN. In addition, when (CNT):(CNH) becomes greater than 3:1 (in Case 1), there is a tendency of the maximum/minimum displacement to decrease, and when (CNT):(CNH) becomes smaller than 1:1 (in Case 5), the difference between the maximum and minimum generative forces and the difference between the maximum and minimum displacements are increased respectively. Therefore, a suitable mixing ratio of CNTs to CNHs is substantially in the range of (CNT):(CNH)=1:1 to 3:1.

Accordingly, the lower limit of a preferable mixing ratio of the carbon particles contained in the first and second electrode layers 3 and 4 may be about 25 wt % in consideration of 65 mg/265 mg=24.5 wt %

Next, a suitable mixing amount of the polymer and a suitable mixing ratio thereof in the polymer actuator 1 having the above-mentioned basic configuration will be described in terms of generative force and displacement.

Figure 5:
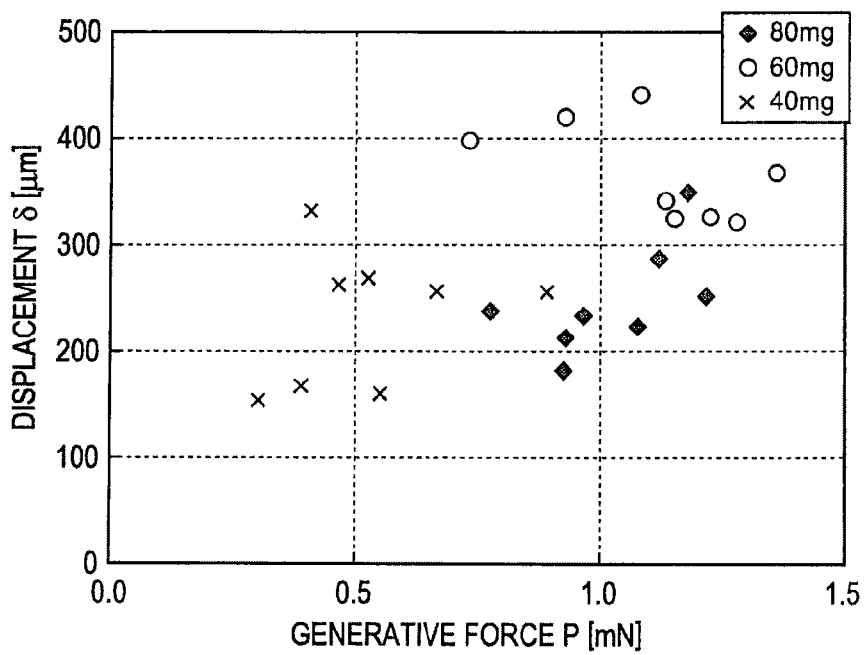
FIG. 5 is a graph showing a relationship between the generative force and the displacement at mixing amounts of the polymer as characteristics of the polymer actuator.

FIG. 5 is a graph showing a relationship between the generative force and the displacement at mixing amounts of the polymer as characteristics of the polymer actuator. Moreover, in FIG. 5, ♦ represents a case where the mixing amount of the polymer is 80 mg, O represents a case where the mixing amount thereof is 60 mg, and x represents a case where the mixing amount thereof is 40 mg respectively.

Moreover, with regard to mixing amounts of the other materials of the first and second electrode layers 3 and 4, for example, the mixing amount of the CNTs is 42 mg, the mixing amount of the CNHs is 23 mg, and the mixing amount of the ionic liquid is 120 mg.

As illustrated in FIG. 5, it can be seen that in order to obtain high generative force P and high displacement δ, the mixing amount of the polymer of 60 mg is the most preferable, and 80 mg and 40 mg are preferable in this order.

Here, the ratio by weight of the polymer to the total weight (carbon nanoparticles+ionic liquid+polymer) is 40 mg/(42+23+120+40) mg=17.7 wt %, 60 mg/(42+23+120+60) mg=24.5 wt %, and 80 mg/(42+23+120+80) mg=30.2 wt % in the cases where the mixing amount of the polymer is 40 mg, 60 mg, and 80 mg, respectively. Therefore, the preferable range of the polymer is equal to or higher than 17.7 wt % and equal to or lower than 30.2 wt %.

As a result, the upper limit of the preferable mixing ratio of the carbon particles is lower than 100 wt %-17.7 wt %=82.3 wt %, and in consideration of the existence of the ionic liquid, is equal to or lower than about 80 wt %, for example, 75.5 wt % (in the case of 24.5 wt % of the polymer), or 69.8 wt % (in the case of 30.2 wt % of the polymer) and the like.

Consequently, the lower limit of the preferable ratio by weight of the carbon particles contained in the first and second electrode layers 3 and 4 is equal to or higher than 25 wt %, and the upper limit thereof is lower than 82.3 wt %, preferably, 80 wt % or less, and more preferably 75.5 wt % or 69.8 wt %.

It should be understood by those skilled in the art that various modifications, combinations, sub-combinations and alterations may occur depending on design requirements and other factors insofar as they are within the scope of the appended claims of the equivalents thereof.

What is claimed is:

1. A polymer actuator comprising:
a pair of electrode layers made of an ionic liquid, a polymer, and carbon nanoparticles; and
an electrolyte layer provided between the pair of electrode layers,
wherein the carbon nanoparticles are a mixture of carbon nanotubes (hereinafter, referred to as CNTs) and carbon nanohorns (hereinafter, referred to as CNHs), a ratio by weight of the carbon nanoparticles to the total weight of the ionic liquid, the polymer, and the carbon nanoparticles contained in the pair of electrodes is equal to or higher than 25 wt % and equal to or lower than 80 wt %, a mixing ratio of the CNTs to the CNHs contained in the carbon particles is in a range of (CNT):(CNH)=1:1 to 3:1, and a ratio by weight of the polymer is equal to or higher than 17.7 wt % and equal to or lower than 30.2 wt %.

2. The polymer actuator according to claim 1, wherein the mixing ratio of the CNTs to the CNHs is 2:1.

* * * * *